United States Patent [19]

Nakanishi

[11] Patent Number: 5,346,731
[45] Date of Patent: * Sep. 13, 1994

[54] FIBER-REINFORCED RUBBER

[75] Inventor: Yasuyuki Nakanishi, Kobe, Japan

[73] Assignee: Bando Chemical Industries, Ltd., Kobe, Japan

[*] Notice: The portion of the term of this patent subsequent to Nov. 3, 2009 has been disclaimed.

[21] Appl. No.: 728,335

[22] Filed: Jul. 11, 1991

[30] Foreign Application Priority Data

Jul. 12, 1990 [JP] Japan .................. 2-186090

[51] Int. Cl.⁵ .................. F16G 1/10; F16L 11/08; C08K 7/02
[52] U.S. Cl. .................. 428/34.5; 428/36.1; 428/36.3; 428/36.8; 428/295; 428/376; 428/379; 428/396; 428/492; 523/222; 138/123; 138/126; 138/127; 138/174; 152/527; 152/536; 152/563; 474/263; 474/268; 87/8; 87/9
[58] Field of Search .................. 156/148, 149, 138-141; 428/36.3, 36.8, 36.91, 34.5, 365, 376, 379, 396, 295, 377, 492; 152/527, 536, 563; 138/174, 123, 125, 126, 127, 132; 87/1, 6, 8, 9; 474/261-265, 267-268; 523/222

[56] References Cited

U.S. PATENT DOCUMENTS

| | | | |
|---|---|---|---|
| 1,400,301 | 12/1921 | McClurg | 152/556 |
| 1,442,924 | 1/1923 | Carlisle | 428/293 |
| 2,739,090 | 11/1946 | Waugh | 474/265 |
| 3,447,308 | 6/1969 | Fontijn | 152/536 |
| 3,584,516 | 6/1971 | Burpulis | 474/265 |
| 3,720,569 | 3/1973 | Kimble | 152/536 |
| 3,919,018 | 11/1975 | Schroeder | 152/536 |
| 3,921,691 | 11/1975 | Kenyon | 152/527 |
| 4,013,101 | 3/1977 | Logan | 138/174 |
| 4,155,394 | 5/1979 | Shepherd et al. | 523/222 |
| 4,504,258 | 3/1985 | Tanaka et al. | 428/492 |
| 4,643,938 | 2/1987 | Oyama | 428/295 |
| 4,668,318 | 5/1987 | Piccoli | 156/149 |
| 4,681,558 | 7/1987 | Rausch | 474/205 |
| 4,684,567 | 8/1987 | Okamoto | 428/365 |
| 4,859,380 | 8/1989 | Ogata | 156/149 |
| 4,893,665 | 1/1990 | Reuter | 152/527 |
| 5,001,961 | 3/1991 | Spain | 87/1 |
| 5,051,299 | 9/1991 | Brown | 428/295 |
| 5,160,301 | 11/1992 | Nakanishi et al. | 474/263 |

OTHER PUBLICATIONS

Patent Abstracts of Japan, vol. 8, No. 112 (M-298) [1549], 25th May 1984; & JP-A-59 19 744 (Mitsuboshi Belt) Jan. 2, 1984.

Patent Abstracts of Japan, vol. 5, No. 183 (M-97) [855], 21st Nov. 1981; & JP-A-56 103 008 (Bandoo Kagaku) Aug. 17, 1981.

Primary Examiner—Ellis P. Robinson
Assistant Examiner—Rena L. Dye
Attorney, Agent, or Firm—Wenderoth, Lind & Ponack

[57] ABSTRACT

A fiber-reinforced rubber article has a rubber body portion with a fiber reinforcement embedded therein. The fiber reinforcement includes a plurality of tubular braided cords braided by yarns. Each of the tubular braided cords is braided by more than three yarns at a braid angle in a range between 10° and 35°, wherein said braid angle is an angle between a yarn of the tubular braided cord and the axial line of the tubular braided cord. Each tubular braided cord also has a fistulous center hole defined by the tubular braided cord.

19 Claims, 2 Drawing Sheets

FIBER-REINFORCED RUBBER

BACKGROUND OF THE INVENTION

The present invention relates to a fiber-reinforced rubber and more particularly to a reinforcement embedded in a rubber.

Since high plessley, high elasticity, high dimensional stability, and high adhesive strength has been required for rubbers such as a belt, a tire, and a hose, a reinforcing cord constructed by fibers or a reinforcing canvas is embedded in a rubber. Generally, cords consist of twisted yarns is used for the reinforcement. The cords is grouped into all-yarns-twisted cords, half-yarns-twisted cords, or lang lay. The all-yarns-twisted cords are most popular for reinforcement for a rubber.

However, when the all-yarns-twisted cords are embedded on a rubber as reinforcement, monofilaments rub each other at sharp angle within the all-yarns-twisted cord. Accordingly, the yarn is abraded, broken, or decreased in strength from that rubbed part after short period of usage. Therefore, flex fatigue is lowered.

Japanese Patent Application Laying Open Gazette No. 59-19744 proposed a fiber-reinforced rubber, which reinforcement is constructed by half-yarns-twisted cords or lang lay to solve the above problem (flex fatigue).

However, a rubber reinforced by half-yarns-twisted cords or lang lay is lowered in elongation and rate tensile elasticity after dipping process, comparing with a rubber reinforced by all-yarns-twisted cords. This results in lower dimensional stability.

Also, since the half-yarns-twisted cords or lang lay are twisted in only one direction, inversion and loose of cords are easily caused at all end. This makes the processing of the cord harder. Furthermore, fray is easily caused in a place where the cord is cut during processing of the cord.

When the half-yarns-twisted cords or lang lay are used as a reinforcement for the industrial belt, there exists a problem such that only one side of the belt is abraded soon since the running belt creeps to one side. This creep is caused by a twisted direction of the cords such like a half-yarns-twisted cord. On the other hand, the Japanese Patent Application Laying Open Gazette No. 56-103008 disclosed a conveyor belt, in which a reinforcement consists of half-yarns-twisted cords of S-twist and Z-twist alternately in order to prevent the uneven abrasion. However, in this case, two cords (both are half-yarns-twisted cords) arc set in parallel and spiral in a belt and accordingly, totally four places on right and left sides or the belt are cut in every pair of cords. Therefore, the maintainability of plessley is lowered.

On the other hand, a braided cord has been used for various purposes. Particularly, a tubular braid surpasses in flex fatigue due to its constructional properties, and it is also superior to a twisted cord in dimensional stability. Therefore, time tubular braid will improve both the flex fatigue and dimensional stability if it is used for a reinforcement for a rubber. Furthermore, in processing, the tubular braids possess an advantage such that loose, which occurs in half-yarns-twisted cords and lang lay at an end of cord by the inversion, is not caused. Therefore, cut end is not frayed at processing the tubular braids. Furthermore since tubular braids do not possess the twisted direction which half-yarns-twisted cords possess, time industrial belt maintains stable running without creeping and consequently, uneven abrasion can be prevented.

Although even the tubular braids possess various advantages as mentioned above, it need to be improved since some rubbers, where time tubular braids arc embedded for reinforcing, require higher bending fatigue and dimensional stability according to its usage and object.

SUMMARY OF THE INVENTION

The object of the present invent ion is to use a tubular braid in stead of a twisted cord for a reinforcement, and specify braid angle, which is an angle between a yarn braided to form a tubular braid and an axial line of the tubular braid, so as to provide a rubber with high flex fatigue, dimensional stability, and longer service life.

In order to achieve the above objects, in a rubber where fiber reinforcement is embedded, the reinforcement is constructed by tubular braids formed by more the three yarns and braid angle is in a range between 10° and 35°.

DESCRIPTION OF THE PREFERRED EMBODIMENT

Preferred embodiment will be described below in reference to accompanying drawings.

Figure 3:
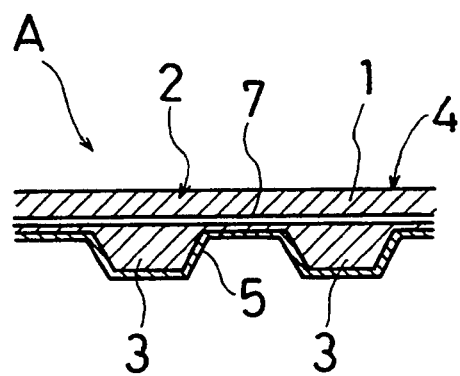
FIG. 3 is a vertical front section of a synchronous belt.
Figure 4:
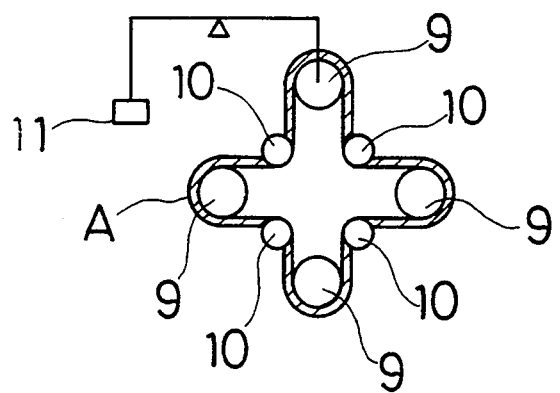
FIG. 4 is an explanatory drawing or the testing system for flex fatigue.
Figure 5:
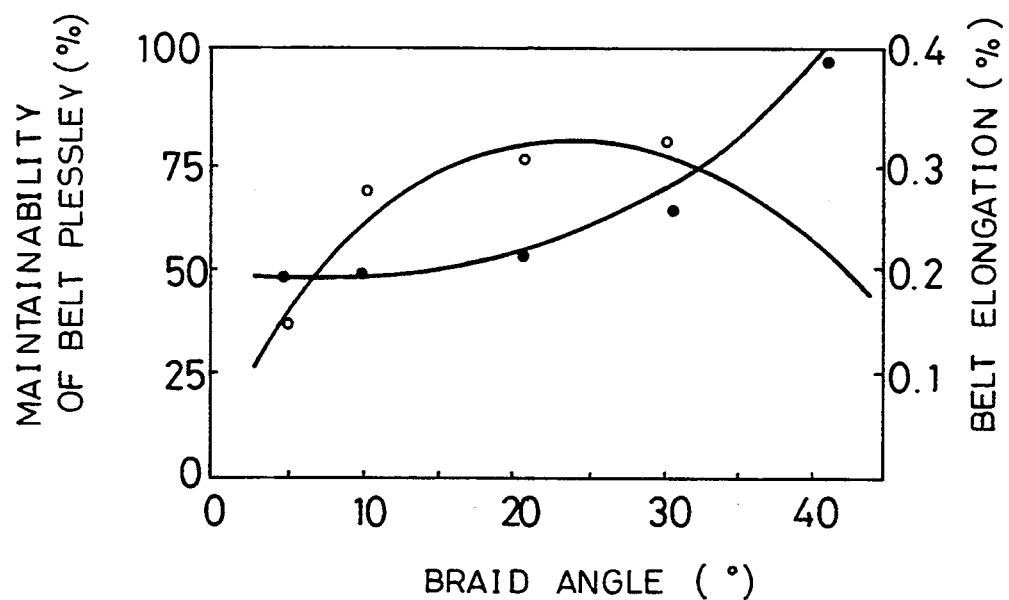
FIG. 5 is a graph showing braid angle, maintainability of plessley, and belt elongation.

FIG. 3 illustrates a synchronous bolt A which is a fiber-reinforced rubber. The synchronous belt A comprises a belt base 4 having a stretching rubber layer 1 and a plurality of teeth 3 formed over one side thereon (only two teeth are shown in lower side of the belt in FIG. 3). A plurality or teeth 3 are made of the same material, a rubber, as the stretching rubber layer 1. A fiber reinforcement 2 is embedded on the stretching rubber layer 1 of the belt base 4. A canvas layer 5 is adhered on a surface of teeth 3 of the belt base 4.

Figure 1:
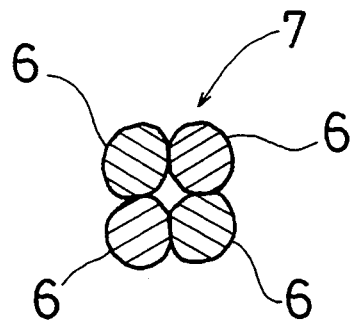
FIG. 1 is an enlarged vertical side section or a tubular cord.
Figure 2:
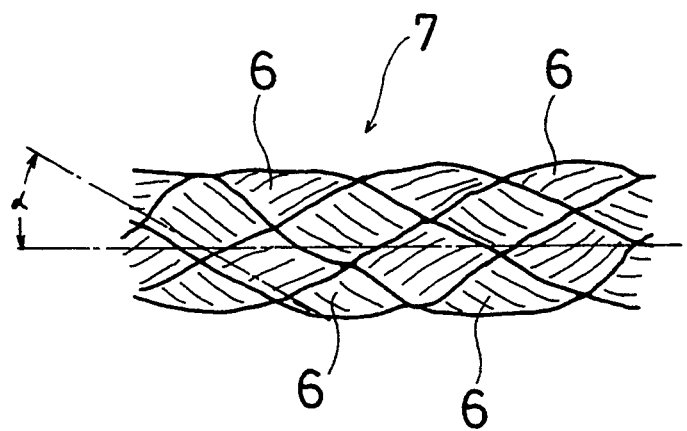
FIG. 2 is an enlarged vertical front section or a tubular cord.

The present invention is characterized in that the reinforcement 2, as shown in enlarged and detailed illustrations of FIGS. 1 and 2, is constructed by a plurality of tubular braids 7 braided by more than three yarns 6 of (four yarns in the present embodiment) at braid angle ($\alpha$) of 10°~35°, where the braid angle refers to an angle between a yarn braided to form a braid and an axial line of the braid.

The yarns 6 may consist of inorganic fibers, organic fibers, or metallic fibers. Further, short or long fiber spun yarns or combinations of those can be used for the yarns 6 according to the required performance of the synchronous belt A.

Also, the number of yarns 6 can be more than three, preferably more than four and an even number. In order to make a cord of tubular configuration, the number of yarns should be more than three. More than four and an even number of yarns can make a tubular cord having a symmetrical fistrous part.

In the above embodiment, if the center cord is provided in a center hole of the tubular cord 7, the dimensional stability, in addition to the flex fatigue, will be improved.

Moreover, in the present embodiment, the synchronous belt A is shown as a rubber. However, the bolt is not limited to the synchronous belt A, but covers all industrial belt such as a conveyor belt and a transmission belt like a flat belt and a ribbed belt. The present invention also can be applied to rubbers other than belts, for example, tires and hoses.

What is claimed is;

1. A fiber-reinforced rubber article, comprising:
   a rubber body portion; and
   a fiber reinforcement embedded in said rubber body portion, said fiber reinforcement comprising a plurality of tubular braided cords braided by yarns, each said tubular braided cord being braided by more than three yarns at a braid angle in a range between 10° and 35° wherein said braid angle is an angle between a said yarn forming said tubular braided cord and the axial line of said tubular braided cord, and each said tubular braided cord having a fistulous center hole defined by said tubular braided cord.

2. The fiber-reinforced rubber article of claim 1, wherein said yarns of said tubular braided cords comprise inorganic fibers.

3. The fiber-reinforced rubber article of claim 1, wherein said yarns of said tubular braided cords comprise organic fibers.

4. The fiber-reinforced rubber article of claim 3, wherein said organic fibers of said yarns are aramid fibers.

5. The fiber-reinforced rubber article of claim 1, wherein said yarns of said tubular braided cords comprise metallic fibers.

6. The fiber-reinforced rubber article of claim 1, wherein said yarns of said tubular braided cords comprise long fiber spun yarns.

7. The fiber-reinforced rubber article of claim 1, wherein said yarns of said tubular braided cords comprise short fiber spun yarns.

8. The fiber-reinforced rubber article of claim 1, and further comprising a center cord disposed in said center hole of said tubular braid.

9. The fiber-reinforced rubber article of claim 1, wherein said rubber body portion defines a belt having a direction of elongation, and said fiber reinforcement is embedded in said belt with the axial lines of said tubular braided cords extending in said direction of elongation.

10. The fiber-reinforced rubber article of claim 9, wherein said belt defined by said rubber body portion is an endless power transmission belt.

11. The fiber-reinforced rubber article of claim 10, wherein said endless power transmission belt is a synchronous belt, and said rubber body portion includes a belt base comprising an elongated rubber layer and a plurality of teeth formed on one side of said elongated rubber layer and made of the same material as said elongated rubber layer, said fiber reinforcement being embedded in said elongated rubber layer.

12. The fiber-reinforced rubber article of claim 1, wherein said rubber body portion defines a conveyor belt.

13. The fiber-reinforced rubber article of claim 1, wherein said rubber body portion defines a tire.

14. The fiber-reinforced rubber article of claim 1, wherein said rubber body portion defines a hose.

15. A fiber-reinforced rubber article, comprising:
    a rubber body portion; and
    a fiber reinforcement embedded in said rubber body portion, said fiber reinforcement comprising a plurality of tubular braided cords braided by yarns, each said tubular braided cord being braided by more than three yarns at a braid angle in a range between 10° and 35°, wherein said braid angle is an angle between a said yarn forming said tubular braided cord and the axial line of said tubular braided cord, and wherein said rubber body portion defines an endless belt having a direction of elongation and said fiber reinforcement is embedded with the axial lines of said tubular braided cords extending in said direction of elongation.

16. The fiber-reinforced rubber article of claim 15, wherein said belt defined by said rubber body portion is an endless power transmission belt.

17. A fiber-reinforced rubber as claimed in 16, wherein said endless power transmission belt is a synchronous belt, and said rubber body portion includes a belt base comprising an elongated rubber layer and a plurality of teeth formed on one side of said elongated rubber layer and made of the same material as said elongated rubber layer, said fiber reinforcement being embedded in said elongated rubber layer.

18. The fiber-reinforced rubber article of claim 15, wherein each said tubular braided cord has a fistulous center hole defined by said tubular braided cord.

19. The fiber-reinforced rubber article of claim 18, and further comprising a center cord disposed in said center hole of said tubular braid.

* * * * *